US009730176B2

(12) United States Patent
Starsinic et al.

(10) Patent No.: US 9,730,176 B2
(45) Date of Patent: Aug. 8, 2017

(54) IDENTIFIERS AND TRIGGERS FOR CAPILLARY DEVICES

(71) Applicant: InterDigital Patent Holdings, Inc., Wilmington, DE (US)

(72) Inventors: Michael F. Starsinic, Newtown, PA (US); Dale N. Seed, Allentown, PA (US); Chonggang Wang, Princeton, NJ (US); Guang Lu, Thornhill (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/727,375

(22) Filed: Jun. 1, 2015

(65) Prior Publication Data

US 2015/0264659 A1 Sep. 17, 2015

Related U.S. Application Data

(63) Continuation of application No. 13/737,725, filed on Jan. 9, 2013, now Pat. No. 9,049,685.
(Continued)

(51) Int. Cl.
*H04W 4/00* (2009.01)
*H04W 60/04* (2009.01)
(Continued)

(52) U.S. Cl.
CPC ........... *H04W 60/04* (2013.01); *H04L 61/106* (2013.01); *H04L 61/303* (2013.01); *H04W 4/001* (2013.01);
(Continued)

(58) Field of Classification Search
CPC ................................ H04W 4/14; H04W 60/00
(Continued)

(56) References Cited

U.S. PATENT DOCUMENTS

| 8,644,864 B2 | 2/2014 | Zeira et al. |
| 8,812,836 B2 | 8/2014 | Meyerstein et al. |

(Continued)

FOREIGN PATENT DOCUMENTS

| CN | 102307348 | 1/2012 |
| CN | 102325004 A | 1/2012 |

(Continued)

OTHER PUBLICATIONS

European Telecommunications Standards Institute, "Machine-to-Machine communications (M2M); Functional Architecture," ETSI TS 102 690 V1.1.1 (Oct. 2011).
(Continued)

*Primary Examiner* — David Q Nguyen
(74) *Attorney, Agent, or Firm* — Volpe and Koenig, P.C.

(57) ABSTRACT

Methods and apparatuses for capillary network device registration implemented in a wireless transmit/receive unit (WTRU) are disclosed. Registration or bootstrap messages may be received by a capillary network device where the WTRU acts as a gateway for communication between the capillary device and a network such as a 3GPP network. A capillary network device identifier (CNDID) is sent to the capillary device. A packet data protocol (PDP) context or PDN connection may be established with the network and the CNDID may be sent to a machine type communications (MTC) server. The WTRU may create the registration message, establish a connection with the network, and forward the registration message to the MTC server. Methods and apparatuses implemented in a network are also disclosed for identifying, addressing, and triggering the capillary devices from the MTC server. The trigger message may include fields for group communication, reducing signaling, and enabling charging.

20 Claims, 12 Drawing Sheets

Related U.S. Application Data

(60) Provisional application No. 61/594,596, filed on Feb. 3, 2012.

(51) Int. Cl.
*H04W 76/02* (2009.01)
*H04L 29/12* (2006.01)
*H04W 88/16* (2009.01)

(52) U.S. Cl.
CPC ......... *H04W 4/005* (2013.01); *H04W 76/021* (2013.01); *H04L 61/2514* (2013.01); *H04W 88/16* (2013.01)

(58) Field of Classification Search
USPC ... 455/414.1, 411, 433, 68, 435.1, 418, 466, 455/517
See application file for complete search history.

(56) References Cited

U.S. PATENT DOCUMENTS

| | | | |
|---|---|---|---|
| 2013/0115993 A1* | 5/2013 | Jain | H04W 4/005 455/517 |
| 2013/0155948 A1 | 6/2013 | Pinheiro et al. | |
| 2016/0269853 A1* | 9/2016 | Kim | H04W 76/02 |

FOREIGN PATENT DOCUMENTS

| | | |
|---|---|---|
| WO | 2011/098150 | 8/2011 |
| WO | WO 2011098150 A1 * | 8/2011 |
| WO | 2012/136005 | 10/2012 |

OTHER PUBLICATIONS

Renesas Mobile Europe Ltd, "MTC Gateway Device," 3GPP TSG-SA WG1 Meeting #56, S1-113041 (Nov. 14-18, 2011).
Third Generation Partnership Project, "Technical Specification Group Services and System Aspects; Service Requirements for Machine-Type Communications (MTC); Stage 1 (Release 10)," 3GPP TS 22.368 V10.5.0 (Jun. 2011).
Third Generation Partnership Project, "Technical Specification Group Services and System Aspects; Service Requirements for Machine-Type Communications (MTC); Stage 1 (Release 11)," 3GPP TS 22.368 V11.3.0 (Sep. 2011).
Third Generation Partnership Project, "Technical Specification Group Services and System Aspects; Service Requirements for Machine-Type Communications (MTC); Stage 1 (Release 11)," 3GPP TS 22.368 V11.6.0 (Sep. 2012).
Third Generation Partnership Project, "Technical Specification Group Services and System Aspects; Service Requirements for Machine-Type Communications (MTC); Stage 1 (Release 12)," 3GPP TS 22.368 V12.1.0 (Dec. 2012).
Third Generation Partnership Project, "Technical Specification Group Services and System Aspects; Service Requirements for Machine-Type Communications (MTC); (Release 11)," 3GPP TR 23.888 V1.2.0 (Apr. 2011).
Third Generation Partnership Project, "Technical Specification Group Services and System Aspects; System Improvements for Machine-Type Communications (MTC); (Release 11)," 3GPP TR 23.888 V1.6.0 (Nov. 2011).
Third Generation Partnership Project, "Technical Specification Group Services and System Aspects; System Improvements for Machine-Type Communications (MTC); (Release 11)," 3GPP TR 23.888 V11.0.0 (Sep. 2012).
Verizon Wireless et al., "Additional Usecases for TR 22.988," 3GPP TSG-SA WG1 Meeting #56, S1-113033 (Nov. 14-18, 2011).
Muhanna et al., "Details of the M2M Identifiers Info Model," Third Generation Partnership Project 2, M2M Numbering AdHoc (Jan. 26, 2011).
Josiam et al., "IEEE 802.16p Machine to Machine (M2M): Proposed Text on M2M Group Identifier," IEEE 802.16p-11/0055 (Mar. 16, 2011).
Muhanna et al., "M2M Identifiers Info Model ," 3GPP2, M2M Numbering AdHoc (Jan. 2011).
Huawei et al., "Protocol Stack for MTC triggering via MTCsp and delivery via SMS," SA WG2 Meeting #88, S2-114926 (Nov. 14-18, 2011).
Third Generation Partnership Project, "Technical Specification Group Services and System Aspects; Architecture enhancements to facilitate communications with packet data networks and applications (Release 11)," 3GPP TS 23.682 V11.3.0 (Dec. 2012).
Third Generation Partnership Project, "Technical Specification Group Services and System Aspects; Architecture enhancements to facilitate communications with Packet Data Networks and Applications (Release 11)," 3GPP TS 23.682 V0.1.0 (Nov. 2011).
ITRI, "Discussion on MTC Gateway for Capillary Network," 3GPP TSG-SA WG1 Meeting #51, Seoul, South Korea, S1-102143 (Aug. 23-27, 2010).
Bluetooth, "Specification of the Bluetooth System," Bluetooth Core Specification Addendum 2 (Dec. 27, 2011).
Bluetooth, "Specification of the Bluetooth System," Bluetooth Core Specification Addendum 3 rev. 2 (Jul. 24, 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Draft P802.11-REVmb/D12 (Nov. 2011).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
IEEE Standard for Local and metropolitan area networks—Part 15.4: Low-Rate Wireless Personal Area Networks (LR-WPANs), Amendment 3: Physical Layer (PHY) Specifications for Low-Data-Rate, Wireless, Smart Metering Utility Networks, IEEE Std 802.15.4g-2012 (Apr. 27, 2012).
IEEE Standard for Local and metropolitan area networks—Part 15.4: Low-Rate Wireless Personal Area Networks (LR-WPANs), IEEE Std 802.15.4™-2011 (Revision of IEEE Std 802.15.4-2006) (Sep. 5, 2011).
Third Generation Partnership Project, "Technical Specification Group Services and System Aspects; Study on Enhancements for MTC; (Release 11)," S1-121460, 3GPP TSG-SA WG1 Meeting #58, Seville, Spain, (May 7-11, 2012).

* cited by examiner

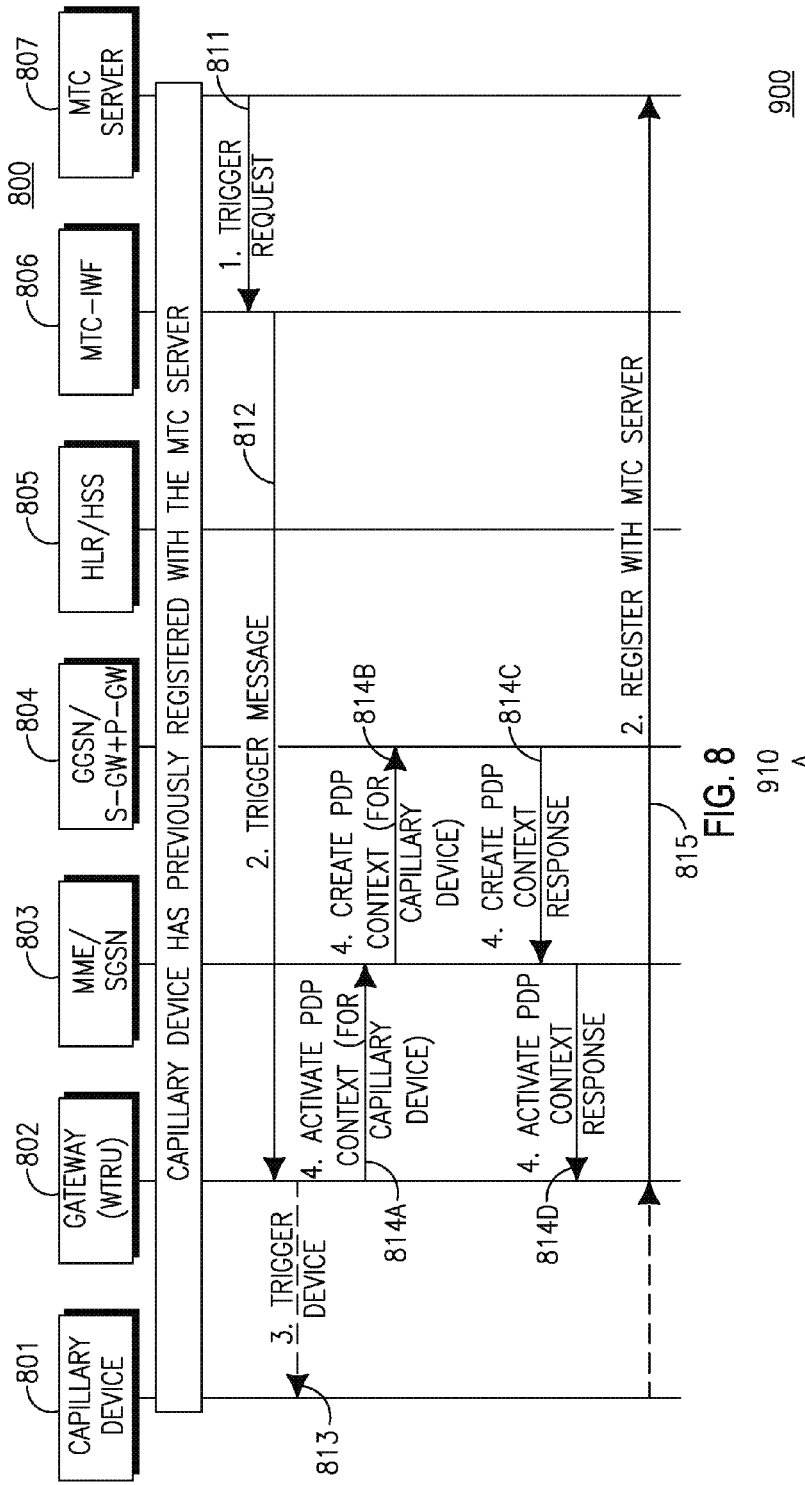

IDENTIFIERS AND TRIGGERS FOR CAPILLARY DEVICES

CROSS REFERENCE TO RELATED APPLICATIONS

This application is a continuation of U.S. Non-Provisional application Ser. No. 13/737,725 filed Jan. 9, 2013 which claims the benefit of U.S. Provisional Application No. 61/594,596 filed Feb. 3, 2012, the content of which is hereby incorporated by reference herein.

BACKGROUND

It may be desirable to allow devices to have a communications link, such as the ability to connect to the Internet or to gateways, using a first protocol-defined network, such as IEEE 802.15.4, IEEE 802.11, or Bluetooth. The gateway may use a second protocol, such as a third generation partnership project (3GPP) protocol, to connect to the Internet. These devices may not be registered with or known to the 3GPP network, and they may not have 3GPP compliant radios. These devices may be referred to as capillary network devices and may connect to the 3GPP network via gateways.

Machine to machine (M2M) devices as well as ordinary wireless communication devices may have limited functionality. This limited functionality may include certain types of wireless radios, such as short range wireless technologies like 802.11 and Bluetooth. These devices may lack cellular communication technology, such as 3GPP radios or other similar cellular wireless communication technology. These types of devices, when co-located, may form a capillary network, and may communicate with each other using the available short range wireless technology. One or more devices in the capillary network may be 3GPP compliant devices.

As such, it is desirable to have a method and apparatus to identify, address, and trigger devices that are connected behind 3GPP compliant gateways. Further, it is desirable to have a method and apparatus for a gateway or a machine type communication (MTC) server to create MTC groups and assign group IDs to devices that are connected behind 3GPP compliant gateways.

SUMMARY

Methods and apparatuses for capillary network device registration implemented in a wireless transmit/receive unit (WTRU) are disclosed. Registration or bootstrap messages may be received from a capillary network device where the WTRU acts as a gateway for communication between the capillary network device and a network such as a 3GPP network. Furthermore, one or more fields of a capillary network device identifier (CNDID) are sent to the capillary network device or group of capillary network devices. A packet data protocol (PDP) context, or Packet Data Network (PDN) connection, may also be established with the network and a registration message for the capillary network device may be sent to a machine type communications (MTC) server, where the WTRU forwards the registration message to the MTC server on a condition that the WTRU receives the registration message from the capillary network device. The registration message may include the CNDID of the capillary network device. In one embodiment, the WTRU may create the registration message on behalf of the capillary network device, establish a PDP context or PDN connection with the network, and forward the registration message to the MTC server.

Methods and apparatuses implemented in a network are also disclosed for identifying, addressing, and triggering the capillary network devices. The CNDID may be recognizable to the core network (CN) but would not need to be registered with the CN. The MTC server may trigger the capillary network devices connected to the CN behind gateways, which is facilitated by use of the CNDID. The MTC server trigger message may include various fields that may be used to facilitate group communication, reduce signaling, and enable charging of capillary network devices.

BRIEF DESCRIPTION OF THE DRAWINGS

A more detailed understanding may be had from the following description, given by way of example in conjunction with the accompanying drawings wherein:

FIG. 8 is an example of a flow diagram of an MTC server triggering a capillary network device.

FIG. 9 is an example of the possible fields for a triggering message;

DETAILED DESCRIPTION

Figure 1A:
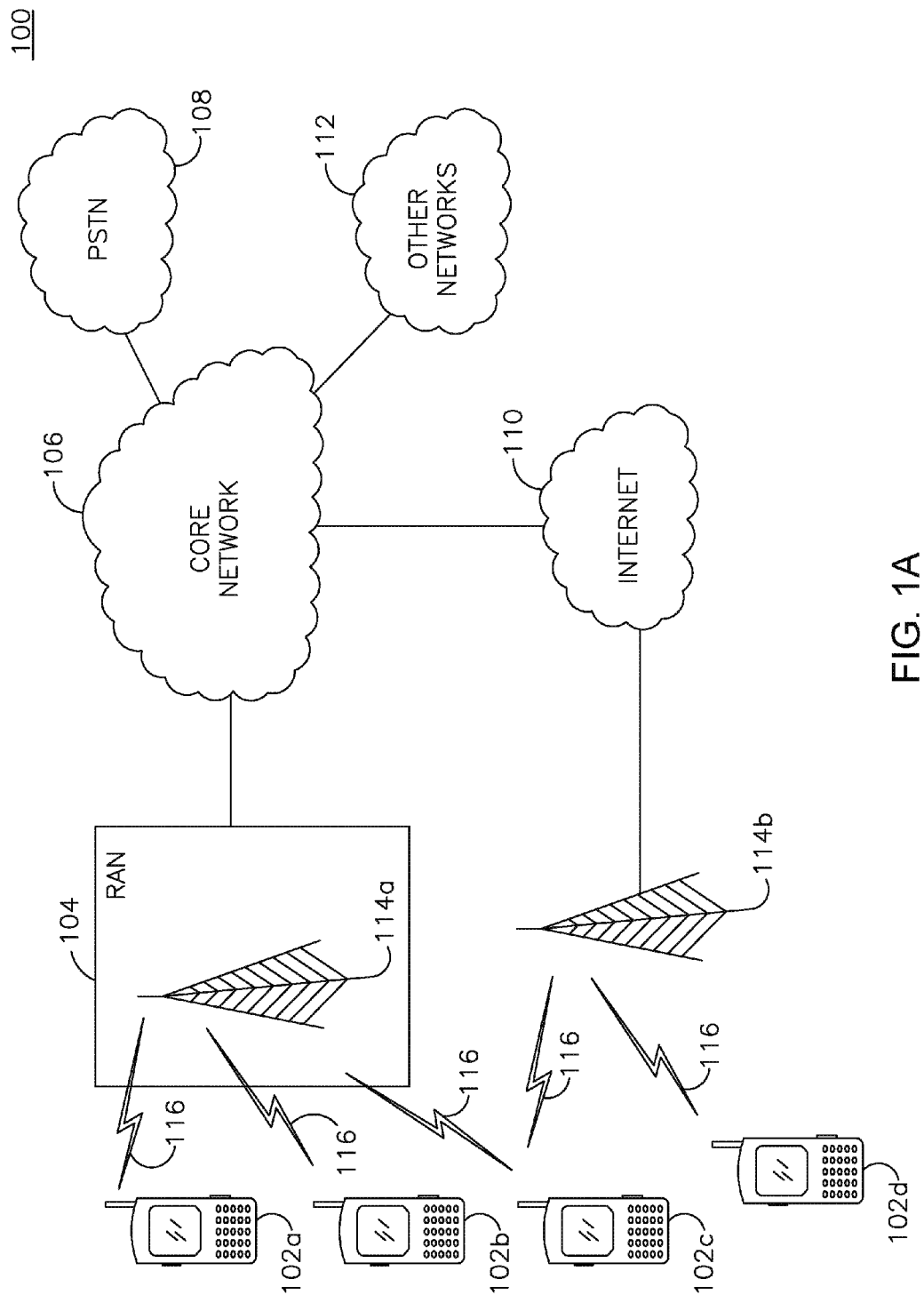
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
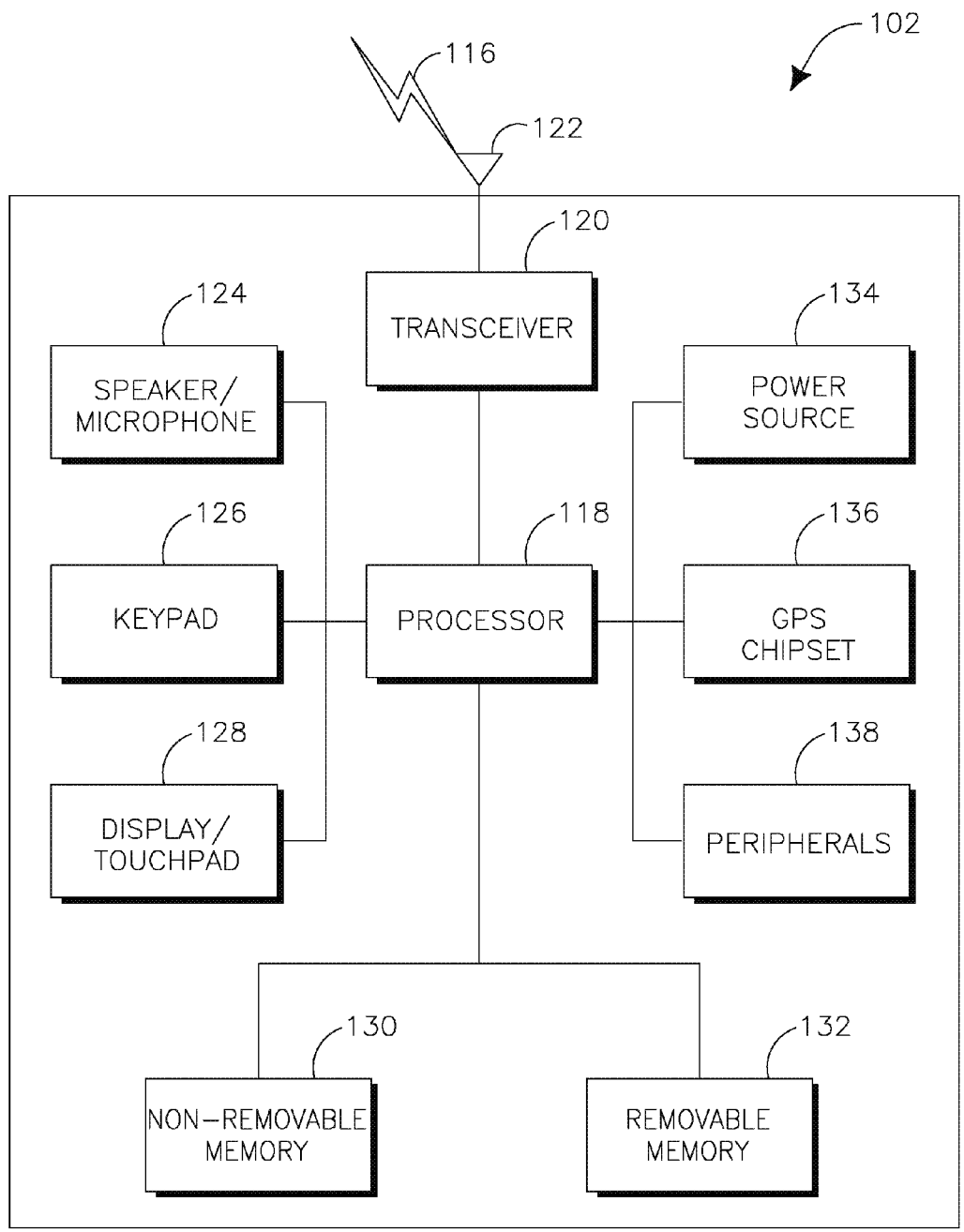
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
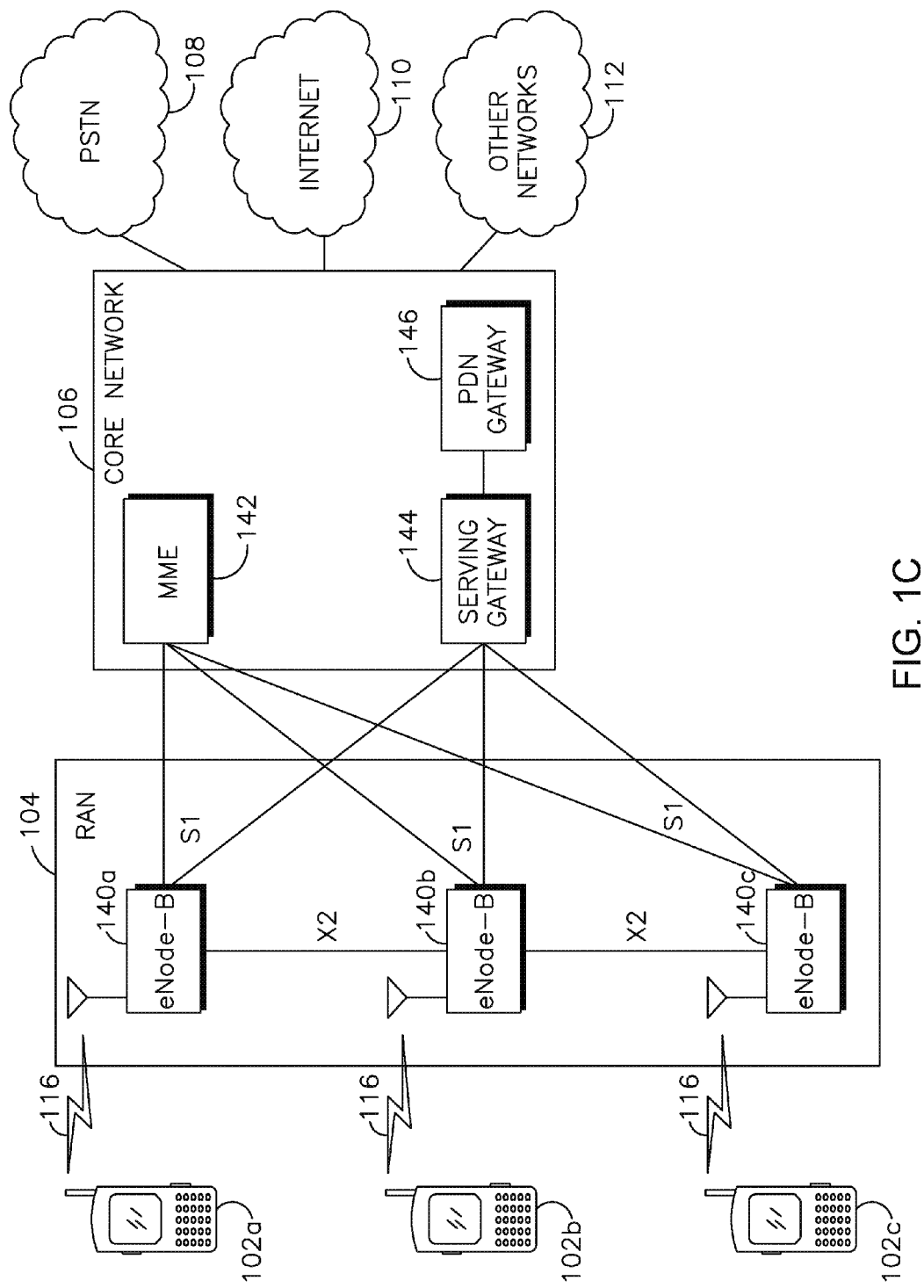
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 2:
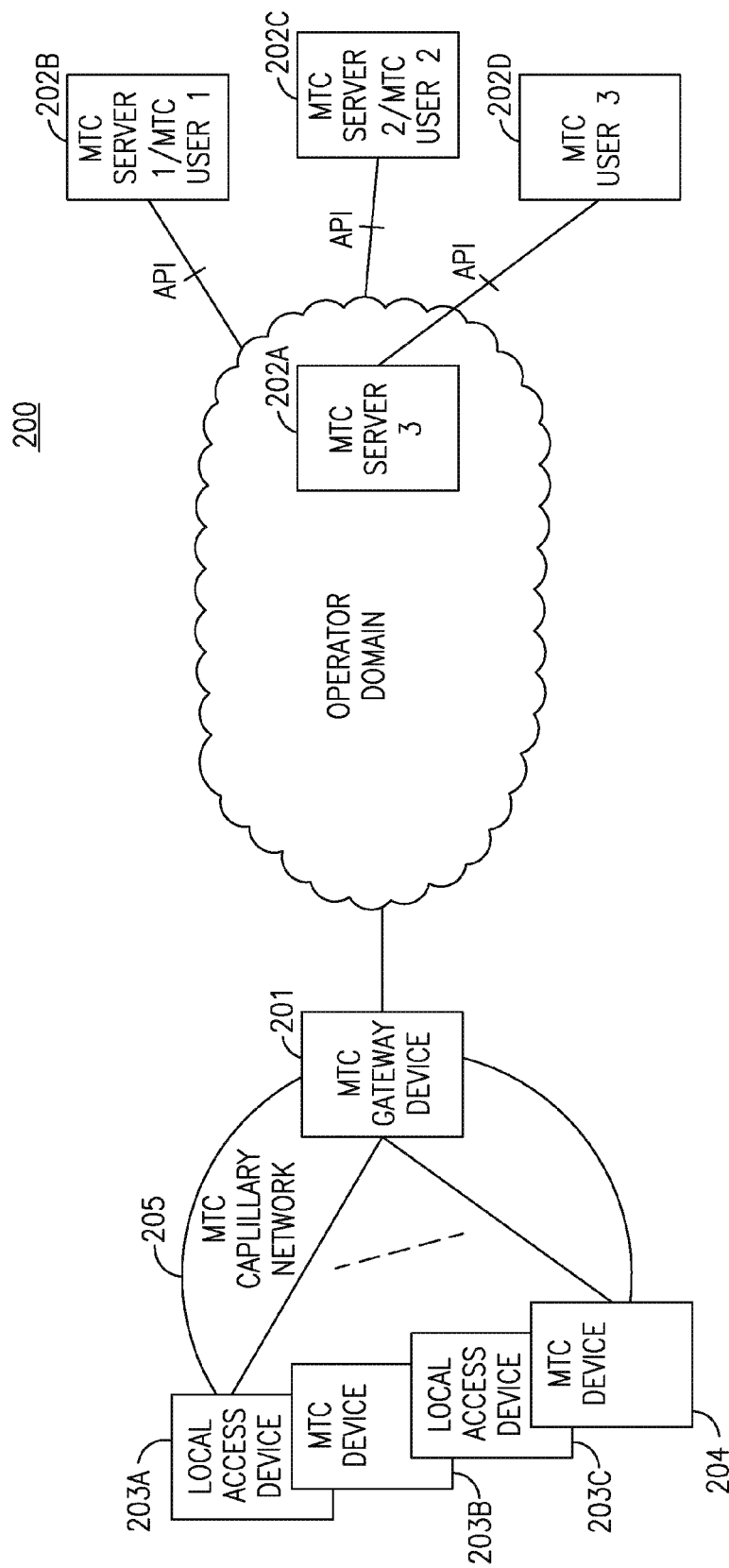
FIG. 2 is a system architecture diagram with a machine-type communication (MTC) gateway device communicating with an MTC server.

FIG. 2 shows a deployment model with a machine type communication (MTC) gateway 201 device communicating with a plurality of MTC servers 202a, 202b, 202c, or 202d. Devices 203a, 203b, 203c, and 204 may connect to the operator domain via a network such as a third generation partnership project (3GPP) network via the gateway 201.

Devices 203a, 203b, 203c, and 204 connecting to the Internet via 3GPP compliant gateway 201 are referred to as capillary network devices in an MTC capillary network 205. Capillary network devices 203a, 203b, and 203c typically do not have 3GPP compatible radios, and may be low-resource capillary network devices that infrequently transmit and receive small amounts of data, such as a thermostat or environmental sensor. These low-resource devices may also be referred to as D' (or d-prime) devices. Capillary network device 204 may be a higher-end capillary network device that transmits and receives data at higher data rates, such as a camera that streams video. However, no distinction needs to be made between the two general categories of capillary network devices 203a, 203b, 203c, and 204 described herein. Furthermore, connection by capillary network devices 203a, 203b, 203c, and 204 to a 3GPP network is described herein, but the methods and apparatuses disclosed are not limited to 3GPP networks and may apply to other types of networks as well.

While capillary network devices 203a, 203b, 203c, and 204 may not be registered or known to the 3GPP core network (CN) or have 3GPP radios, an MTC server 202a, 202b, or 202c may need to identify, address, and trigger these capillary network devices 203a, 203b, 203c, and 204 that are connected behind 3GPP compliant gateway 201.

In a 3GPP network, a gateway 201 may be identified by its international mobile subscriber identity (IMSI) and addressed with an Internet protocol (IP) address. Due to security concerns, mobile network operators (MNO) may not want to communicate the IMSI and internal IP address to an MTC server. Thus, an external identifier may be defined.

Figure 3:
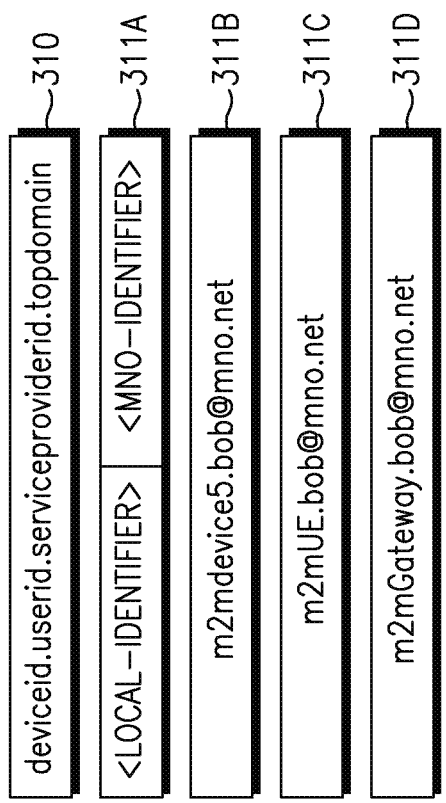
FIG. 3 is an example of formats for external device identifiers.

FIG. 3 shows examples 310, 311a, 311b, 311c, and 311d of the formats that may be used for external identifiers 300. The external device identifier 300 may be a fully qualified domain name (FQDN) and may be called an international service provider subscription identifier (ISSI) 310 as formatted in FIG. 3.

Figure 4:
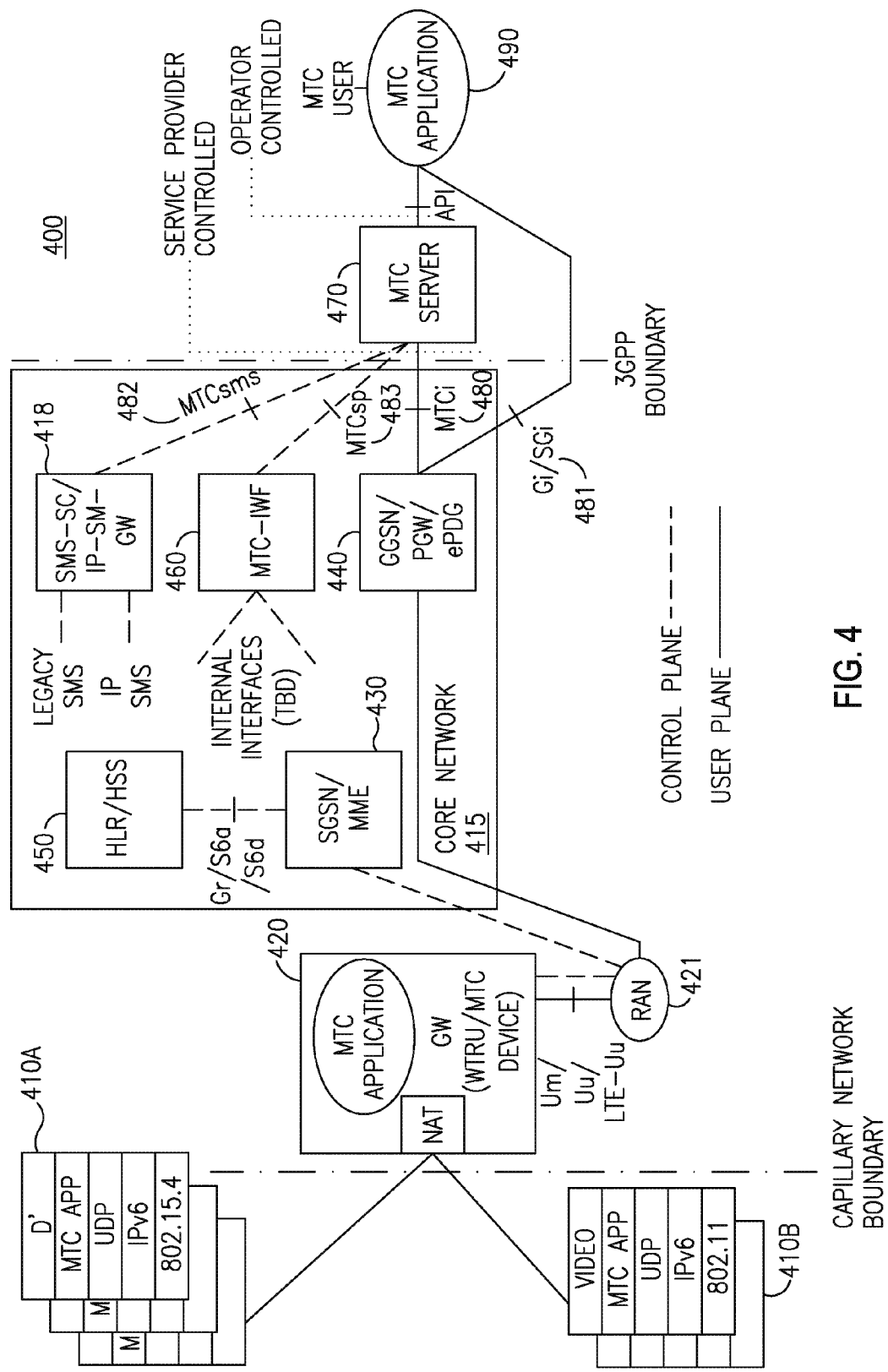
FIG. 4 is an example of an architecture for machine type communications (MTC) that is modified for capillary networks according to one embodiment.

FIG. 4 shows an example architecture for MTC 400 network in a 3GPP network that is modified for connecting capillary network devices 410a and 410b in accordance with one embodiment. The MTCsms 482, MTCsp 483, and MTCi 481 that are shown in FIG. 4 are reference points and may be used to meet M2M architecture requirements. The capillary network devices 410a and 410b, may connect to an MTC server 470 via a gateway WTRU 420 via a protocol. The gateway WTRU 420 acts as a gateway to the Internet/MTC 400 network for the capillary devices 410a and 410b. In the example of FIG. 4, capillary network device 410a connects to the gateway 420 via IEEE 802.15.4 while capillary network device 410b connects to the gateway via IEEE 802.11.

The capillary network devices 410a and 410b may be in an address space that is private from the 3GPP network. In the example of FIG. 4, the capillary network is a private IP version 6 (IPv6) network, the 3GPP network is IPv4, and the MTC server 470 is accessible via the public internet, (e.g., IPv4). The architecture of FIG. 4 is non-limiting, however, and other combinations of IPv4 and IPv6 may be contemplated.

The gateway WTRU 420 is connected to the CN 415 via a RAN 421. The MTC Server (also referred to as Services Capability Server (SCS)) 470 may need to address and/or trigger the non-3GPP capillary network devices 410a and 410b that may be using the 3GPP compliant gateway WTRU 420.

In a 3GPP network, a WTRU 420 may be identified by its IMSI and addressed with an IP address. A machine type communications-interworking function (MTC-IWF) 460 may map the external identifier to the IMSI, and may store this mapping in a local memory. The external identifier may be used on the MTCsp 483 and MTCsms 482 reference points to identify the WTRU 420. When the WTRU 420 is addressed on the MTCi 480, or Gi/SGi 481 reference points, IP addressing may be used. A network address translation (NAT) function may be used to translate between private IP addresses in the 3GPP network and the public IP address that is used by the MTC server 470 to address capillary network devices 410a and 410b via the WTRU 420.

When capillary network devices 410a and 410b connect to a 3GPP network 400 via a gateway WTRU 420, the capillary network devices 410a and 410b may be assigned capillary network device identifiers (CNDID). The CNDID may then be used by an MTC Server (also referred to as Services Capability Server (SCS)) 470 to address and send triggers towards the capillary network devices 410a and 410b without requiring the MTC server 470 to distinguish between 3GPP devices such as the gateway WTRU 420 and non-3GPP devices such as the capillary network devices 410a and 410b and also without requiring additional application level signaling at the MTC application 490.

For example if capillary network devices 410a and 410b are IEEE 802.15.4 compliant devices that connect to the Internet via a 3GPP gateway WTRU 420, the capillary network devices 410a and 410b may be assigned a CNDID by the WTRU 420. Thus, the need for a large number of capillary network devices 410a and 410b to be registered in a central CN 415 entity may be avoided.

Although the capillary network devices 410a and 410b and gateway WTRU 420 may not always be connected to the 3GPP CN, or may not always have an IP address assigned, it may be necessary for the MTC server 470 and/or MTC application 490 to be able to individually address the capillary network devices 410a and 410b behind the gateway 420. Thus, it may be necessary for the MTC server 470 and/or MTC application 490 to be able to send a trigger indication towards the gateway 420 and the capillary network device or devices 410a and 410b that the MTC server 470 wants to trigger.

The MTC server 470 may use the MTCsp 483 or MTC-sms 482 reference points to request a trigger towards a capillary network device 410a and 410b via the SMS-SC 418 or MTC-IWF 460. The trigger procedure may be initiated via the SMS-SC 418. Examples of trigger delivery mechanisms may be via short message service (SMS) or non-access stratum (NAS) messaging. The MTC server 470 may identify the capillary network device 410a and 410b by its external identifier on the MTCsp 483 and MTCsms 482 reference points. The MTC-IWF 460 may use its interface to a home subscriber server (HSS) 450 or a home location register (HLR) 450 to translate the external identifier to an IMSI and initiate the trigger procedure. When capillary network devices 410a and 410b are addressed on the MTCi 480, or Gi/SGi 481 reference points, IP addressing may be used.

When a capillary network device 410a and 410b receives the trigger message, it may establish an IP connection with the MTC server 470. The serving GPRS support node (SGSN)/mobility management entity (MME) 430 and gateway GPRS support node (GGSN)/Packet Data Network Gateway (P-GW) 440 may be used by the WTRU 420 to establish a packet data protocol (PDP) context or PDN connection for the capillary network device 410a and 410b.

Figure 5:
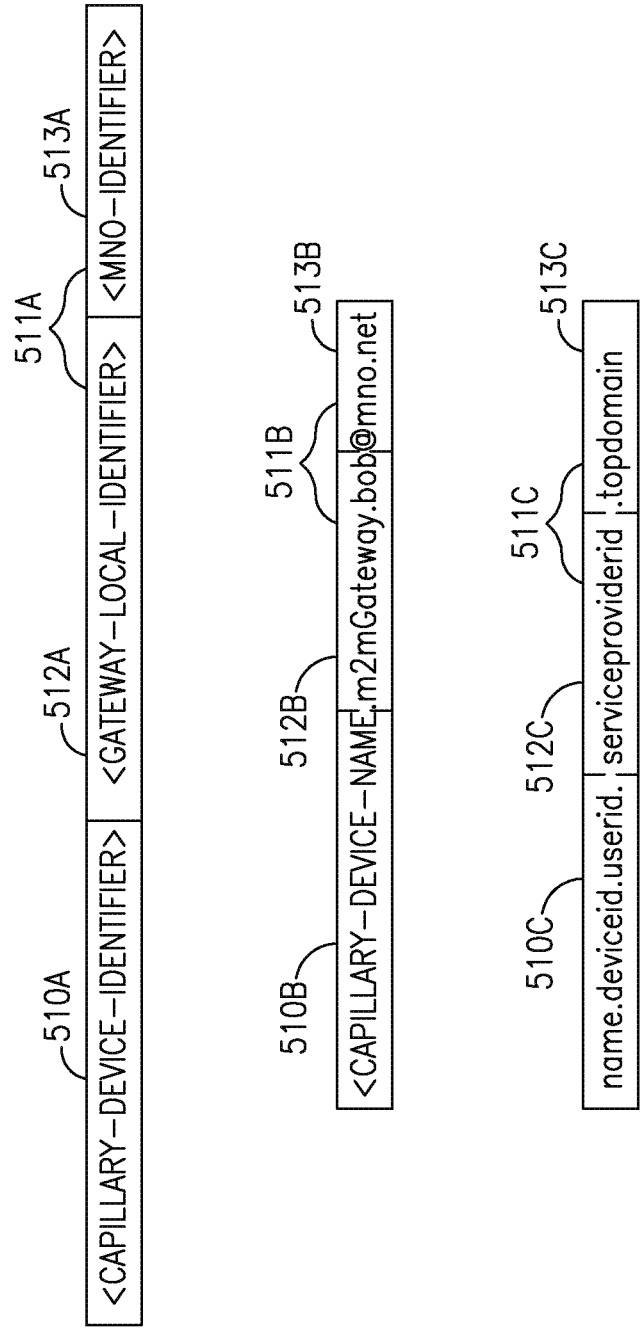
FIG. 5 is an example of formats for capillary network device identifiers (CNDID)

FIG. 5 is an example of CNDID 500 formats, which may be formed by adding a new field to the external identifier of the gateway WTRU. The examples in FIG. 5 may be formed by adding a prefix field 510a, 510b, or 510c to the gateway external identifier 511a, 511b, or 511c, respectively. The gateway external identifier 511a, 511b, or 511c may include the local identifier 512a, 512b, 512c and the MNO identifier 513a, 513b, 513c. The new field 510a, 510b, 510c need not be a prefix: it may be any new field 510a, 510b, or 510c that may be added to the gateway ID 511a, 511b, 511c to form a new CNDID 500.

For example, the <Capillary-Device-Identifier>510a of the identifier may be assigned by the WTRU and/or negotiated between the WTRU and the capillary network devices. The <Capillary-Device-Identifier>510a of the CNDID 500 may include, but is not limited to, a medium access control (MAC) address, a hardware serial number, a simple sequential number, or a descriptive name, such as backyard_motion_sensor.

Although the CNDID may not need to register with the CN, CN entities may recognize the CNDID 500. For example, the presence of the <Capillary-Device-Identifier>510a in the identifier may indicate to the CN that the CNDID 500 belongs to a particular capillary network device. The suffix of the CNDID 511a may identify the gateway WTRU through which the capillary network device is communicating.

Figure 6:
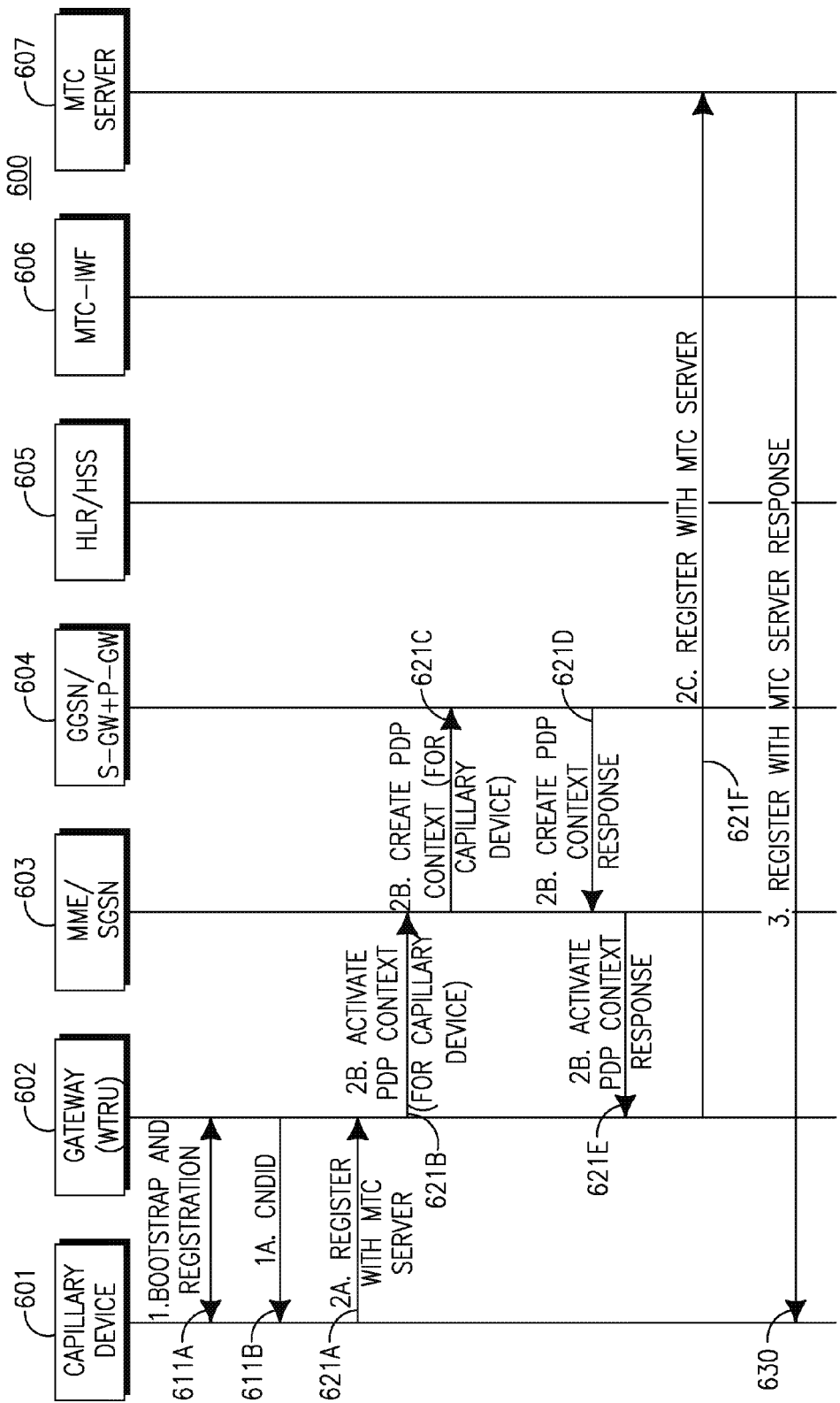
FIG. 6 is an example of a CNDID assignment and capillary network device registration.

FIG. 6 shows a CNDID assignment and capillary network device registration 600 signal flow diagram. During the device bootstrap procedure 611a, a CNDID 611b may be assigned. A capillary network device 601 may connect for example, to a M2M gateway such as a WTRU 602, where the WTRU 602 establishes an IP connection to the MTC server 607, and the capillary network device 601 registers 621f with the MTC server 607. The capillary network device 601 may also be assigned an IP address and/or other identifiers for the local capillary network.

During the CNDID assignment and capillary network device registration 600 method, a capillary network device 601 bootstraps and registers 611a with the gateway WTRU 602. The gateway WTRU 602 may then provide a CNDID 611b to the capillary network device 601. In one embodiment, it may not be necessary for the capillary network device 610 to receive an entire CNDID 611b. For example the prefix field may be sufficient. In some embodiments, 611a and 611b may not be necessary; the capillary network device 601 may derive its own CNDID.

The capillary network device 601 may then register with the MTC server 607. The associated call flow 600 may apply where an IP connection is not currently established with the CN. The capillary network device 601 initiates a registration message 621a. Alternatively, the gateway WTRU 602 may initiate the registration message 621a on behalf of the capillary network device 601.

The gateway WTRU 602 then may establish a packet data protocol (PDP) context 621b, 621c, 621d, and 621e via the MME/SGSN 603 and GGSN/PGW 604 and then is assigned an IP address. The gateway WTRU 602 may use the newly assigned IP address to forward the registration message 621f to the MTC server 607, and the registration message 621f may include the CNDID 611b. The MTC server 607 may use the CNDID format to recognize that the device 601 is a capillary network device communicating behind the gateway WTRU 602. The message 621f may include, but is not limited to, other information such as information about the device's capabilities, intended functionality, location, operation time (duty cycle), and manufacturer. If the capillary network device 601 is 3GPP capable, then this may be indicated in the registration message 621f by including an external identifier in the registration message 621f. The external identifier is what may be used if it was connecting directly to the 3GPP network.

The MTC Server 607 may respond 630 to the capillary network device 601 that it has received the registration request 621f. If the gateway WTRU 602 initiated the registration message 621f, then the response 630 shown in FIG. 6 may terminate at the gateway WTRU 602.

It is permissible for devices 601 to have multiple external identifiers. For example, the capillary network device 601 may be a 3GPP device and before connecting to the gateway WTRU 602, the 3GPP capillary network device 601 may already have an external identifier that may be used when connecting directly to the 3GPP network. However, it may be assigned another identifier when connected to the gateway WTRU 602.

Each time a gateway WTRU 602 assigns a new CNDID 611b, the gateway WTRU 602 may register the CNDID with a CN entity such as a HSS/HLR 605, MTC-IWF 606 or a domain name system (DNS) server. Registration of capillary network devices with a CN entity may require a relatively large amount of information to be stored. However, operators may use this information for charging and facilitating value-added services.

Figure 7:
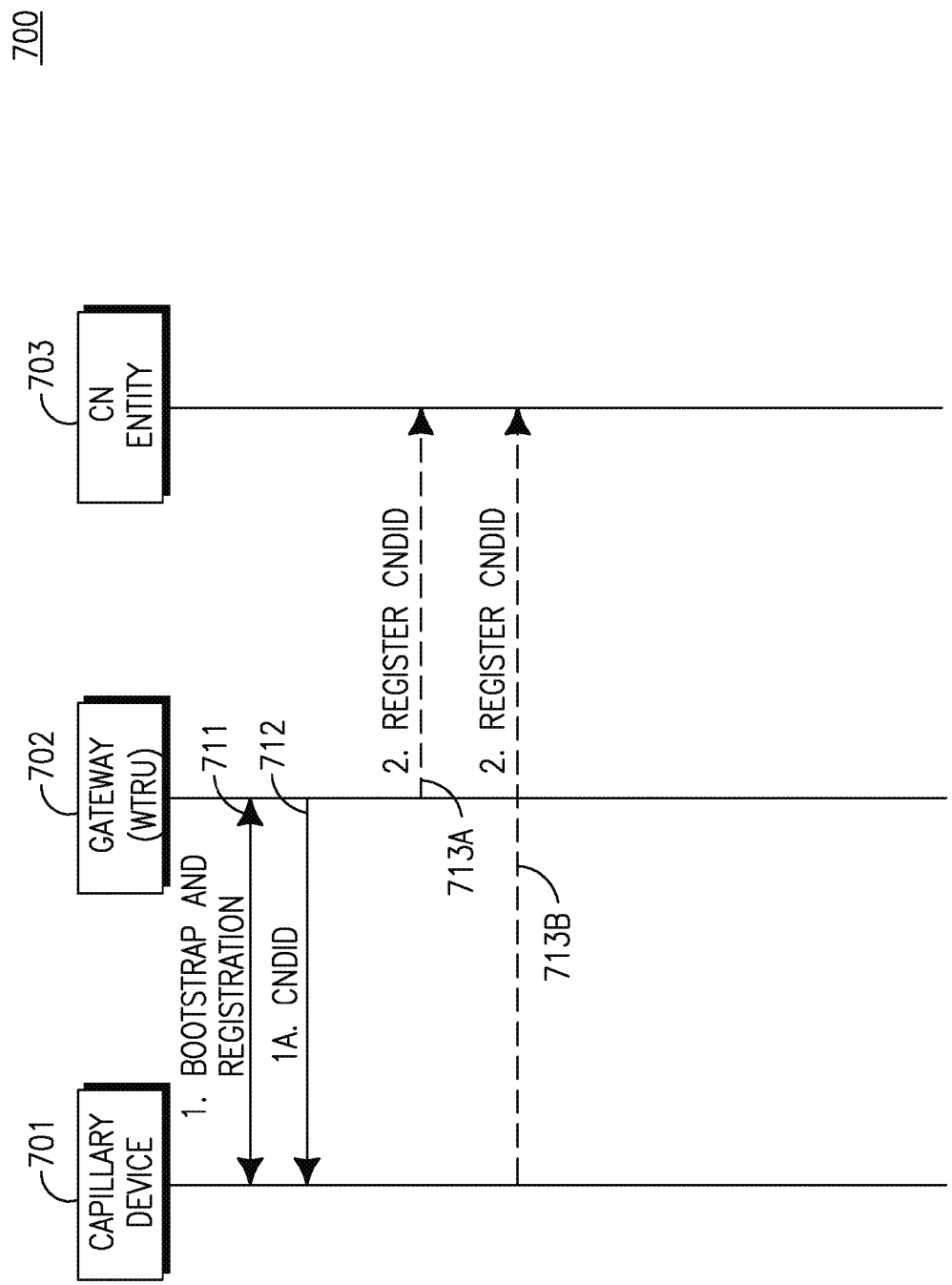
FIG. 7 is an example of CNDID registration with a core network entity.

FIG. 7 shows CNDID registration 700 with a CN entity 703. Referring to FIG. 7 a capillary network device 701 may bootstrap and register 711 with a gateway WTRU 702. The capillary network device 701 may have already been assigned an IP address and/or other identifiers for the local capillary network. The capillary network device 701 may then be informed of its CNDID 712 by the gateway WTRU 702. It may not be necessary for the capillary network device to be told its entire CNDID 712, because for example the prefix field may be sufficient.

The capillary network device 701 may then register the CNDID 713a with the CN entity 703. Alternatively, the gateway WTRU 702 may register the CNDID 713b with the CN entity 703. For example, the CN entity 703 shown in FIG. 7 may be a DNS server, an MTC-IWF, or an HLR.

The message for registering the CNDID 713a or 713b may include information such as CNDID to the gateway external identifier.

Additionally, the message for registering the CNDID 713a or 713b may include the IP address of the gateway WTRU 702, IP address of the capillary network device 701, port number where the capillary network device 701 can be reached, capillary network device 701 capabilities, or the capillary network device's 701 previous CNDID 712 or CNDIDs if applicable. For example, the capillary network device 701 may have previously connected via another gateway WTRU 702, thus, it may have previously been assigned a different CNDID 712.

The message for registering the CNDID 713a or 713b may also include a 3GPP network external ID such as the gateway WTRU external identifier. When 3GPP capable capillary network devices 701 connect, the capillary network device 701 may indicate this capability by including its external identifier in the message for registering the CNDID 713a or 713b. This external identifier may be used if the capillary network device 701 was connecting directly to the 3GPP network.

In another embodiment, the CN may pre-assign the gateway WTRU 702 a pool of CNDIDs 712 that the gateway WTRU 702 is permitted to assign 712 to capillary network devices 701 that connect behind it. The pool of CNDIDs 712 may be assigned as part of the subscription of the gateway WTRU 702, or the gateway WTRU 702 may download the pool of CNDIDs 712 dynamically.

Referring to FIG. 8, an MTC Server 807 may send a trigger 812 towards an MTC device or MTC devices in the capillary network 800. An MTC Server 807 may wish to initiate communication with a capillary network device 801. The gateway WTRU 802 and/or capillary network device 801 may not be online or available for communication, or the gateway WTRU 802 and/or capillary network device 801 may not have an IP address currently assigned to it. In such scenarios, the MTC server 807 may send a trigger 812 to the gateway WTRU 802 and/or capillary network device 801. Once the trigger 812 is received by the gateway WTRU 802 and/or capillary network device 801, it is the responsibility of the gateway WTRU 802 and/or capillary network device 801 to establish a PDP context 814a, 814b, 814c, and 814d and take necessary steps to establish an IP connection to the MTC server 807.

FIG. 8 is a flow diagram 800 of an MTC server 807 triggering a capillary network device 801. The MTC server 807 sends a trigger request 811 to the MTC-IWF 806. The trigger request message 811 includes the CNDID 500 as shown in FIG. 5 of the capillary network device 801.

The MTC-IWF 806 may then initiate the process of sending the trigger message 812 to the gateway WTRU 802. The trigger 812 delivery may be via short message service (SMS), or non-access stratum (NAS) messaging. Other message types may also be used. The trigger message 812 may include the CNDID. Alternatively, only the prefix field of the capillary network device 801 may be sent. The gateway WTRU 802 may then send a message 813 to the capillary network device 801.

The gateway WTRU 802 may also choose to postpone sending a message 813 to the capillary network device 801 until it is closer to the time when the capillary network 801 device actually needs to send information. For example, it may wait until after the PDP context 814a, 814b, 814c, and 814d is established.

The gateway WTRU 802 may also choose to serve as a proxy for the capillary network device 801 and may remove the need to send a message 813 to the capillary network device 801. For example if the MTC Server 807 attempts to read the capillary network device 801, the gateway WTRU 802 may respond with cached data. If the MTC Server 807 attempts to write data, the gateway WTRU 802 may buffer the data and forward it to the capillary network device 801 at another time. For example, when the capillary network device 801 may have certain pre-scheduled "wake-up" times.

When the gateway WTRU 802 does have an IP connection to the MTC server 807 but the capillary network device 801 does not, the MTC server 807 may use application level signaling to inform the gateway WTRU 802 that it needs to establish an IP connection to a particular capillary network device 801. However, this approach may allow the MTC server 807 to avoid sending triggers 812 to capillary network devices 801. This may be undesirable if the MNO is charging the MTC server 807 on a per-trigger 812 basis.

FIG. 9 shows the trigger request and trigger message fields 900, which provide a means for the CN to recognize that capillary network devices and their applications are connected. The gateway external identifier 911 is recognized by the CN. The CN may resolve this field to an IMSI and send the trigger toward the gateway WTRU.

The CNDID(s) 912 is forwarded to the gateway WTRU as part of the trigger contents. This CNDID(s) 912 may be used by the gateway WTRU to determine capillary network devices that need to be triggered. The CNDID 912 may not need to be registered with any CN entity. However, by indicating the CNDID 912 in the trigger request, the CN will be informed that a capillary network device is connected behind the gateway WTRU, and this information may be used for fee charging.

The G-CNDID(s) 913 may be forwarded to the gateway WTRU as part of the trigger contents. This G-CNDID(s) 913 may be used by the gateway to determine the groups of capillary network devices or applications that need to be triggered. The G-CNDID 913 may not need to be registered with any core network entity. However, by indicating the G-CNDID 913 in the trigger request, the core network may be informed that a group is connected behind the gateway WTRU, and this information may be used for fee charging.

The Application ID(s) 914 may be indicated in the trigger. This Application ID(s) 914 may be forwarded to the gateway WTRU as part of the trigger contents and may be used by the gateway to determine which particular applications in the capillary network devices need to be triggered. The Application ID 914 may not need to be registered with any CN entity. However, by indicating the Application ID 914 in the trigger request, the CN will be informed that a capillary network device is connected behind the gateway WTRU, and this information may be used for fee charging.

The MTC Server Contact Address(es) 915 is the transport address (public IP address and port number) that each application may contact. This field may be used when devices are allowed to connect to multiple MTC servers.

The Quality-of-service (QoS) Indication(s) 916 may be indicated for each trigger recipient. When a trigger is received by the gateway WTRU, it may need to initiate a PDP context in order to establish an IP connection to the gateway. The trigger message may provide some indication as to the type of QoS 916 that may be required once the IP connection is established. By including this information in the trigger, the likelihood that the QoS 916 may need to be changed after the PDP context is established is decreased, and thereby reducing signaling.

The Expiration Time(s) 917 may be indicated by the MTC Server for each capillary network device application that is triggered. For example, the gateway WTRU and or CN may ignore and drop the trigger if it is not delivered by the expiration time 917, and as a result Expiration Time(s) 917 may help to avoid an overload condition.

The Trigger Time 918 may be indicated by the MTC server to indicate a time when the IP connection may be established for each trigger recipient. For example, the trigger may be delivered at Trigger Time 918, and Trigger Time 918 may indicate to the gateway WTRU that communication with a particular capillary network application needs to be established at Trigger Time 918 the next day.

Small Data 919 may be included in the trigger request and message if the MTC wants to trigger the capillary network device so that it sends a small amount of data to the capillary network device.

Configuration Information 920 may be included in the trigger request if the MTC server wants to trigger the capillary network device so that it alters the capillary network device's configuration.

Some of the fields 900 as shown in FIG. 9 may be used to facilitate more efficient group communication. Note that a single trigger may be used to initiate communication with multiple capillary network devices behind the same gateway WTRU. The contents 900 of the trigger message may indicate to the gateway WTRU which capillary network applications and/or devices are to be triggered. If the gateway WTRU maintains a mapping between application IDs 914 and capillary network identifiers 912, then the trigger message may only need to include the application identifiers 914.

Some of the fields 900 as shown in FIG. 9 may be used to reduce signaling in the 3GPP network. Since one trigger message may be used for multiple recipients, the number of triggers that need to be sent over the network is decreased. Fields 900 such as Trigger Time 918 allow the MTC server to use a trigger to schedule its communication over the next several minutes, hours, or even several days. By allowing the MTC Server to indicate the required QoS 916 in the trigger message, the PDP context may be initially established with the correct QoS 916. This may reduce the likelihood that the PDP context may need to be modified once it is established. By triggering multiple capillary network devices at the same time, the gateway WTRU may better decide how many PDP contexts it needs to establish and how the capillary network applications can share the PDP contexts.

Some of the fields 900 as shown in FIG. 9 may be used to facilitate charging of capillary network devices. Capillary network device IDs 912 and application IDs 914 do not necessarily need to be registered with the core network. However, the core network may charge MTC service providers based on the number of triggers that are sent, the number of capillary network devices that are triggered, and/or the number of capillary network applications that are triggered. All of this information may be obtained from the trigger messages on the MTCsp or MTCsms.

Figure 10:
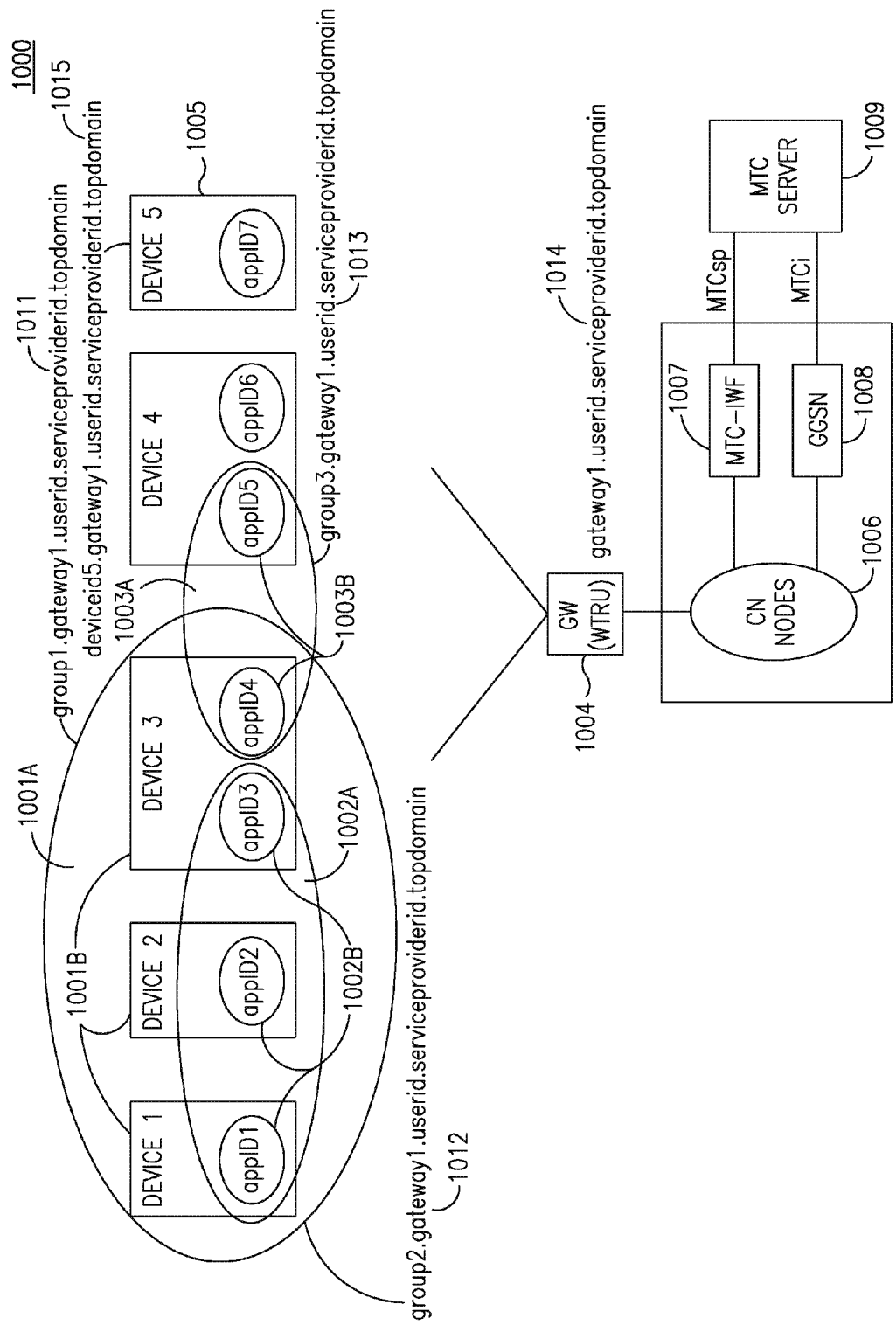
FIG. 10 is an example of capillary network group assignments.

A similar approach for assigning a single CNDID may be used to assign an ID to groups of applications or devices. FIG. 10 shows the assignment of group identifiers 1000. A gateway WTRU 1004 may choose to group devices 1001a and 1002a or applications 1003a based on functionality, location, or some other attribute or set of attributes and assign a group capillary network device identifier (G-CNDID) 1011, 1012, or 1013.

Once a group 1001a, 1002a, or 1003a is formed, a gateway WTRU 1004 may notify an MTC server 1009 of the group 1001a, 1002a, or 1003a, the group members 1001b, 1002b, or 1003b, and attributes of the groups 1001a, 1002a, or 1003a. Similarly, the MTC Server 1009 may choose to create a group 1001a, 1002a, or 1003a and notify the gateway WTRU 1004 of the new group 1001a, 1002a, or 1003a, the group members 1001b, 1002b, or 1003b, and attributes of the groups 1001a, 1002a, or 1003a. Regardless of entity that forms the group, the naming convention may be the same.

FIG. 10 also shows capillary network group assignments, where the mapping between the G-CNDID 1011, 1012, or 1013 and the group members 1001b, 1002b, or 1003b may be stored in the gateway WTRU 1004 and/or the MTC server 1009. The G-CNDID 1011, 1012, or 1013 may be used to trigger or address the groups. Table 1 shows the mapping between the G-CNDID 1011, 1012, or 1013 and the group members 1001b, 1002b, or 1003b from FIG. 10 that may be stored in the gateway WTRU 1004 and/or the MTC server 1009:

TABLE 1

Capillary network group assignments

| Group Name | Group Type | Group Members |
| --- | --- | --- |
| Group1 (1011) | Device (1001a) | Device1, Device2, and Device3 (1001b) |

TABLE 1-continued

Capillary network group assignments

| Group Name | Group Type | Group Members |
|---|---|---|
| Group2 (1012) | Application (1002a) | AppID1, AppID2, AppID3 (1002b) |
| Group3 (1013) | Application (1003a) | AppID4, AppID5 (1003b) |

Similar to the CNDID 1015 assigned to capillary network device 1005, the G-CNDID 1011, 1012, or 1013 may be formed by adding a new field to the external ID of the gateway WTRU 1004 that it uses to connect to the core network 1006, which provides a connection to the MTC server 1009 via the GGSN 1008 and MTC-IWF 1007. The new field may be a group identifier, or group name. An example of a G-CNDID 1011, 1012, or 1013 is shown in FIG. 11.

Figure 11:
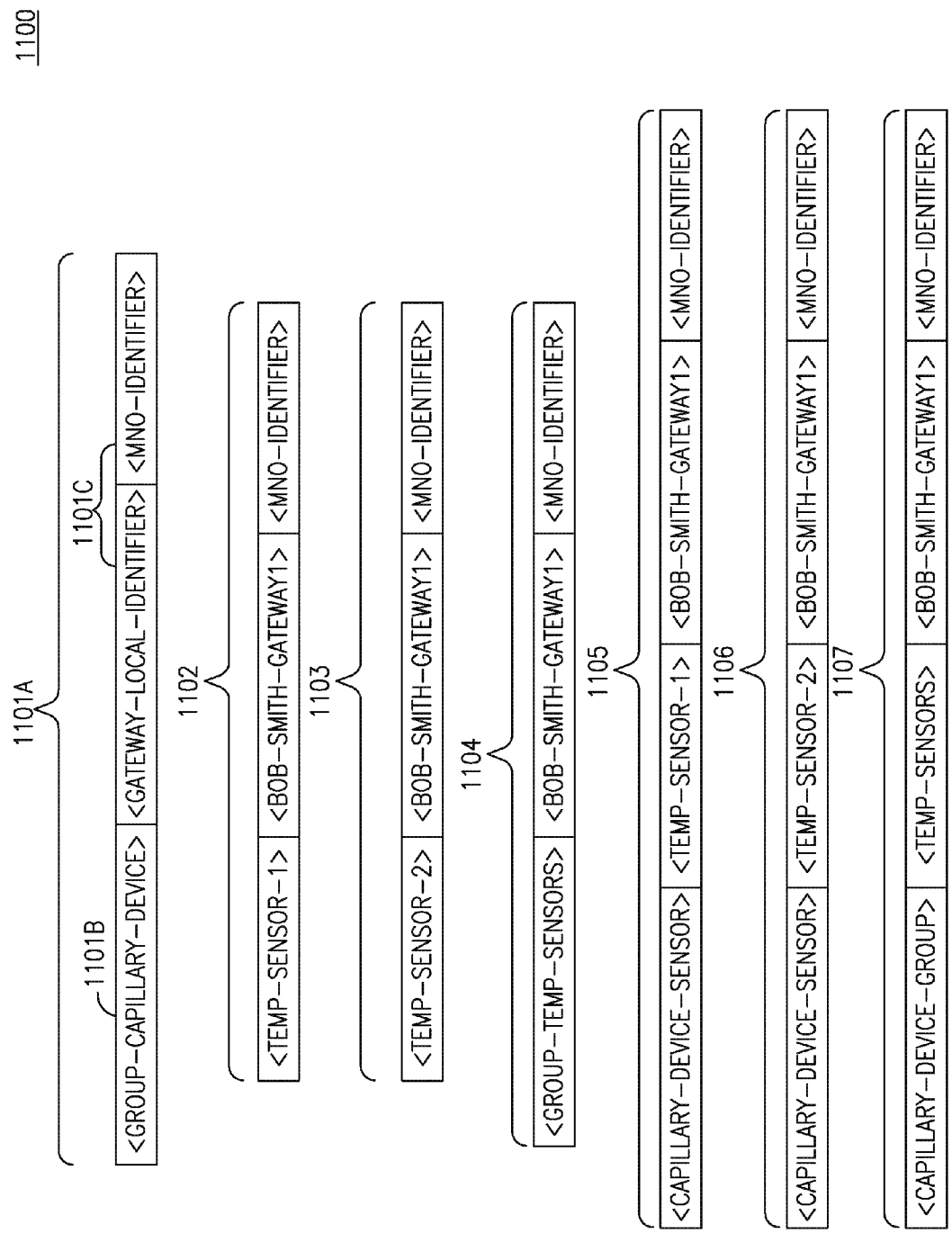
FIG. 11 is an example of group capillary network device identifiers.

FIG. 11 provides an example G-CNDID 1101a. It is noted that the G-CNDID 1101a is formed by adding a prefix field 1101b to the gateway external identifier 1101c. The new field 1101b need not be a prefix, it simply needs to be a new field 1101b that is added to the gateway ID 1101c to form a new group capillary network ID 1101a.

Further, <Group-Capillary-Device-Identifier>1101b names may be formatted such that they are always distinguishable from individual device names as shown in FIG. For example: a CNDID may be 1102a or 1103, and a G-CNDID may be 1104.

In the examples of FIG. 11, the presence of the word "group" in the first field may 1101a be used to distinguish between group identifiers 1101a and individual device identifier 1102. Other words or characters may be used to distinguish between a group identifier and an individual device identifier.

An additional field may be added to the identifier 1107 to indicate what the identifier represents. For example: a there may be a CNDIDs 1105 and 1106 and a G-CNDID 1107.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a wireless transmit/receive unit (WTRU) for capillary network device registration, the method comprising:

sending, from the WTRU, a registration message associated with a capillary network device to a machine type communications (MTC) server via a cellular radio access network (RAN), wherein the registration message includes a capillary network device identifier (CNDID) of the capillary network device; and receiving, at the WTRU, a first trigger message including an application identifier (ID) that identifies an application on the capillary device from a machine type communications-interworking function (MTC-IWF) via the cellular RAN; and transmitting, from the WTRU, a second trigger message to the capillary network device associated with the application ID.

2. The method of claim 1, wherein the first trigger further includes the CNDID of the capillary network device.

3. The method of claim 1, wherein the first trigger further includes quality of service (QoS) information to enable the WTRU to select an appropriate internet protocol (IP) connection to the MTC server.

4. The method of claim 1, wherein the network is a third generation partnership project (3GPP) network.

5. The method of claim 2, wherein the CNDID is formed by adding a field to an external device identifier of the WTRU.

6. The method of claim 2, wherein the CNDID identifies a group of capillary network devices.

7. The method of claim 1, wherein the capillary network device is associated with an internet protocol (IP) address for a local capillary network.

8. The method of claim 1, further comprising:

receiving, at the WTRU, a pool of CNDIDs for assignment to a plurality of capillary network devices.

9. A wireless transmit/receive unit (WTRU), the WTRU comprising:

a transmitter configured to transmit a registration message associated with a capillary network device to a machine type communications (MTC) server via a cellular radio access network (RAN), wherein the registration message includes a capillary network device identifier (CNDID) of the capillary network device; and a receiver configured to receive a first trigger message including an application identifier (ID) that identifies an application on the capillary device from a machine type communications-interworking function (MTC-IWF) via the cellular RAN; and the transmitter further configured to transmit a second trigger message to the capillary network device associated with the application ID.

10. The WTRU of claim 9, wherein the first trigger further includes the CNDID of the capillary network device.

11. The WTRU of claim 9, wherein the first trigger further includes quality of service (QoS) information to enable the WTRU to select an appropriate internet protocol (IP) connection to the MTC server.

12. The WTRU of claim 9, wherein the network is a third generation partnership project (3GPP) network.

13. The WTRU of claim 10, wherein the CNDID is formed by adding a field to an external device identifier of the WTRU.

14. The WTRU of claim 10, wherein the CNDID identifies a group of capillary network devices.

15. The WTRU of claim 9, wherein the capillary network device is associated with an internet protocol (IP) address for a local capillary network.

16. The WTRU of claim 9, further comprising:

the receiver further configured to receive a pool of CNDIDs for assignment to a plurality of capillary network devices.

17. A method for use in a server, the method comprising:
- receiving a registration message associated with a capillary network device from a wireless transmit/receive unit (WTRU) via a cellular radio access network (RAN), wherein the registration message includes a capillary network device identifier (CNDID) of the capillary network device; and
- sending a first trigger message including an application identifier (ID) that identifies an application on the capillary device to the WTRU via a machine type communications-interworking function (MTC-IWF); and
- receiving, from the WTRU, a second trigger message to the capillary network device associated with the application ID.

18. The method of claim 17, wherein the first trigger further includes the CNDID of the capillary network device.

19. The method of claim 17, wherein the first trigger further includes quality of service (QoS) information to enable the WTRU to select an appropriate internet protocol (IP) connection to the server.

20. The method of claim 18, wherein the CNDID is formed by adding a field to an external device identifier of the WTRU.

* * * * *